(12) United States Patent
Zou

(10) Patent No.: US 6,681,218 B1
(45) Date of Patent: Jan. 20, 2004

(54) SYSTEM FOR MANAGING RDBM FRAGMENTATIONS

(75) Inventor: Chendong Zou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,849

(22) Filed: Nov. 4, 1999

(51) Int. Cl.[7] ............................................. G06F 17/30
(52) U.S. Cl. .................. 707/3; 707/2; 707/4; 707/100; 707/102
(58) Field of Search ........................ 707/1, 2, 3, 4, 707/100, 101, 102, 103 R, 104.1

(56) References Cited

U.S. PATENT DOCUMENTS

| | | | | |
|---|---|---|---|---|
| 5,128,860 A | * | 7/1992 | Chapman | 700/99 |
| 5,319,777 A | * | 6/1994 | Perez | 707/10 |
| 5,822,749 A | | 10/1998 | Agarwal | 707/2 |
| 5,829,004 A | * | 10/1998 | Au | 707/100 |
| 5,875,445 A | | 2/1999 | Antoshenkov | 707/2 |
| 5,893,104 A | | 4/1999 | Srinivasan et al. | 707/102 |
| 5,960,426 A | | 9/1999 | Pirahesh et al. | 707/3 |
| 5,974,411 A | * | 10/1999 | McCool et al. | 341/51 |
| 6,122,636 A | * | 9/2000 | Malloy et al. | 707/102 |

OTHER PUBLICATIONS

Downing, Douglas, Ph.D., Covington, Michael Ph.D., and Covington, Melody Mauldin, "Barron's Business Guides: Dictionary of Computer and Internet Terms", Sixth Edition, 1998, Pp. 233 and 476–477.*

* cited by examiner

*Primary Examiner*—Hani M. Kazimi
*Assistant Examiner*—Ella Colbert
(74) *Attorney, Agent, or Firm*—Michael Buchenhorner; Romualdas Strimaitis

(57) ABSTRACT

A relational database system manages data fragments in a database by converting a query or fragmentation expression to an intermediate range representation; mapping the intermediate range representation to an integer range representation; building an index tree data structure to represent a search space associated with the data fragments; and using the index tree data structure to locate a desired data fragment.

40 Claims, 12 Drawing Sheets

Fragmentation data point array (unsorted)

| a. | 'cc' | 'ff' | 'dd' | 'LL' |
|---|---|---|---|---|
| b. | '...' | ... | ... | ... |

Fragment data point array (sorted)

| a | Reserved for NULL | 'cc' | 'dd' | 'ff' | 'LL' |
|---|---|---|---|---|---|
| b | '...' | '...' | ... | ... | ... |

Dimension_t array

SYSTEM FOR MANAGING RDBM FRAGMENTATIONS

BACKGROUND

The present invention relates to indexing and managing data using fragmentation in relational databases.

A database is a collection of information. A relational database is a database that is perceived by its users as a collection of tables. Each table arranges items and attributes of the items in rows and columns, respectively. Each table row corresponds to an item (also referred to as a record or tuple), and each table column corresponds to an attribute of the item (referred to as a field or, more correctly, as an attribute type or field type).

Fragmentation is a technique used to increase database performance. A system supports data fragmentation if a given relation can be divided up into pieces or fragments. Data can be stored at the location where it is used most frequently. Moreover, two types of fragmentation can be used: horizontal fragmentation and vertical fragmentation, corresponding to relational operations of restriction and projection. The rules assigning a row to a fragment are defined by a database user or administrator and are part of a "fragmentation scheme". It is possible for a fragment of a given table to be empty if none of the rows of the table satisfy the fragmentation scheme's assignment rules for that fragment. "Fragment elimination" is a process by which a database system identifies fragments from a table that cannot participate in the result of a query and removes those fragments from consideration in processing the query, thus improving the performance of the database system.

Also, fragments may be stored independently on separate disks or on separate nodes in a computer cluster or network architecture. Logically, all fragments may be scanned simultaneously, thereby increasing the overall rate at which the complete table can be read, subject to the limitations of the physical storage of the data.

As more and more businesses are run from mission-critical systems that store information on database systems, increasingly higher demands are being placed on these database systems to provide enterprise-wide decision support and to provide timely on-line access to critical business information through database queries. Accordingly, the performance of such systems needs to be continually enhanced. One way to enhance the performance of database systems is to improve fragment-related operations.

SUMMARY OF THE INVENTION

A relational database system manages data fragments in a database by converting a query or fragmentation expression to an intermediate range representation; mapping the intermediate range representation to an integer range representation; building an index tree (SKD tree) data structure to represent a search space associated with the data fragments; and using the index tree data structure to locate a desired data fragment.

Implementations of the system may include one or more of the following. The integer range representation can be independent of Structured Query Language (SQL) data types. The tree data structure can update the data fragment. The tree data structure can insert data into a data fragment. The tree data structure can select data in a data set. The tree data structure can be used during internal database operation. The data can be selected using an SQL select statement. The data tree structure can be used to locate the data fragment. The data set can partition into even segments to balance the tree data structure which can be used to populate the tree data structure. The tree data structure can also map all data types into an integer space. Collecting data points can be used in one or more fragmentation expressions; and the data points stored in a multi-dimensional array. The first index can also be used into the array as an index point for a NULL value and also an upper bound of the array can be used as an index point of positive infinity. The intermediate range representation is sorted. The mapping step also may include using a binary search in convert the intermediate range representation into the integer range representation. The index tree data structure represents a multi-dimensional search space. The index tree data structure can be a binary tree, and can be searched with an O(log(N)) search complexity. The data fragments can overlap.

In another aspect, a system contains means for converting a query expression to an intermediate range representation and means for mapping the intermediate range representation to an integer range representation. The system also contains means for building an index tree data structure to represent a search space associated with the data fragments and means for using the index tree data structure to locate a desired data fragment.

Among the advantages of the invention are one or more of the following. The invention provides high performance for managing data fragments in a database. The invention can manage fragmentation schema of arbitrary number of columns. This property allows the invention to manage large databases where the number of columns used for fragmentation can become quite large.

During the construction of the tree, an integer array is used to represent the range structure associated with the fragments. When the tree is used to locate fragments, the index of the array is used to do the search. This is both simple and efficient, because integer comparisons are computationally "cheaper" than SQL type comparisons. In addition, the modeling and mapping from SQL data-type to integer contribute to the simplicity and efficiency of the invention in performing operations with data fragmentation. Overlapping fragments are pruned from the tree, thus improving search performance. Moreover, the height of the tree generated by the invention is minimized. Thus, searching the tree will be fast and efficient. This will make insertion into the database and query optimization (eliminating unnecessary fragments) operations more efficient. Also, the system has a low data storage requirement. Due to these advantages, the invention can efficiently manage data fragments in a database.

Other features and advantages of the invention will become apparent from the following description and from the claims.

DETAILED DESCRIPTION

Figure 1:
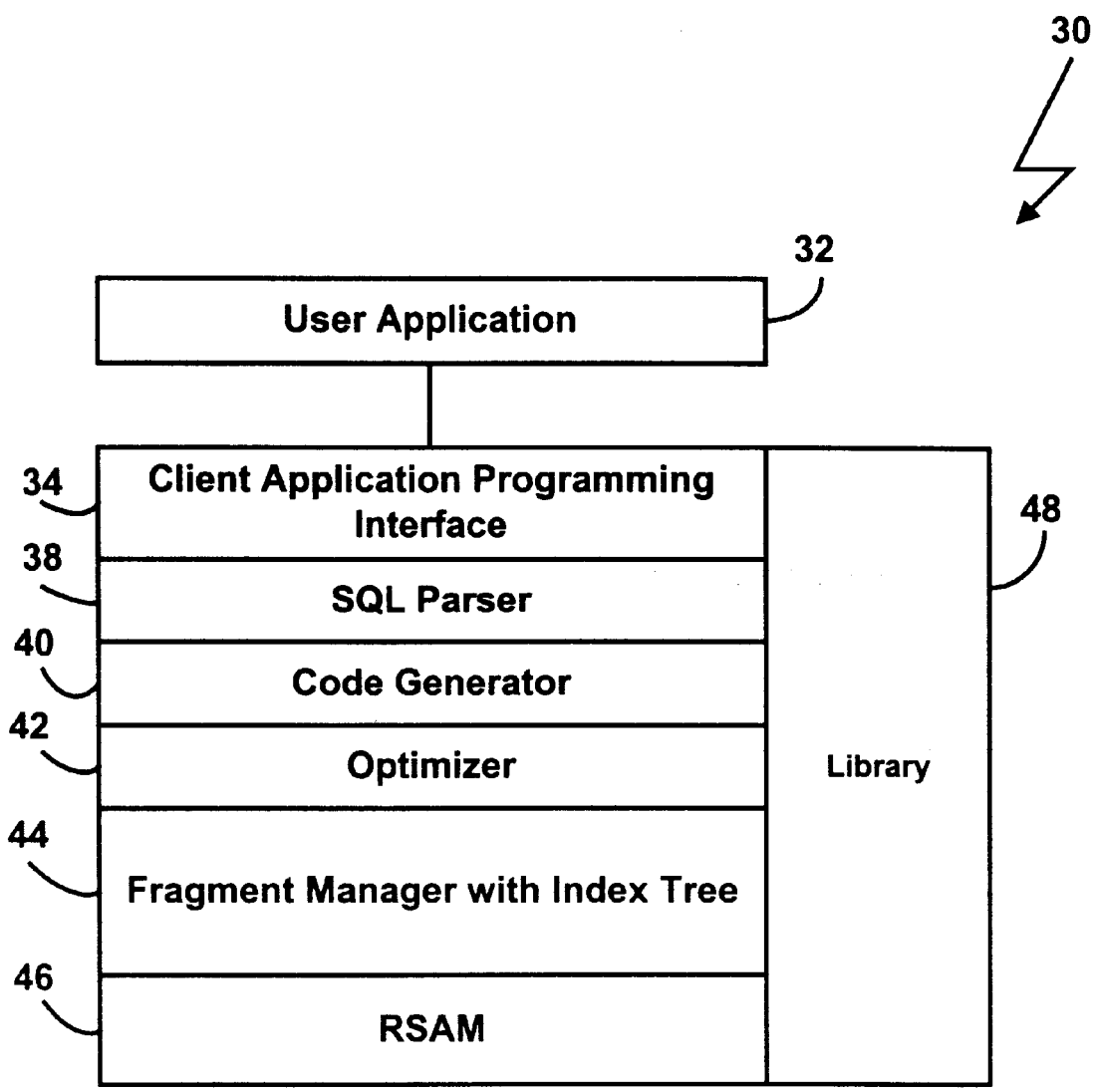
FIG. 1 is a diagram illustrating a database engine in accordance with the present invention.

FIG. 1 represents an embodiment of a database engine 30 in accordance with the present invention. The database engine 30 has a user application 32 that communicates with a client application programming interface (API) 34. The client API 34 in turn communicates with an SQL parser 38 that parses an SQL query with one or more SQL expressions into its constituencies, which may be stored in a binary tree data structure representing the components of the query. The output of the SQL parser 38 is provided to a code generator 40 that outputs intermediate code from the SQL expression. The intermediate code represents an execution plan for satisfying the SQL query. The code generator 40 also eliminates redundant data and performs error-checking, such as confirming the validity of table and column names. This code is then optimized by an optimizer 42, which optimizes the code using a cost-based analysis for formulating a query execution plan. The resulting optimized code associated with the execution plan is provided to a fragment manager 44 that handles references to fragmented tables in accordance to a predetermined fragmentation scheme. The fragment manager 44 deploys an index tree, whose creation and operation are discussed in more details below. The output of the fragment manager 44 is provided to an RSAM 46 for executing the execution plan. The RSAM 46 in turn controls one or more data storage device managers such as disk managers, for example. The client API 34, SQL parser 38, code generator 40, optimizer 42, fragment manager 44 and RSAM 46 reference a library 48 and call various low-level routines such as access methods that will be executed by a processor. The result of the execution plan is provided to the user application 32.

Figure 2A:
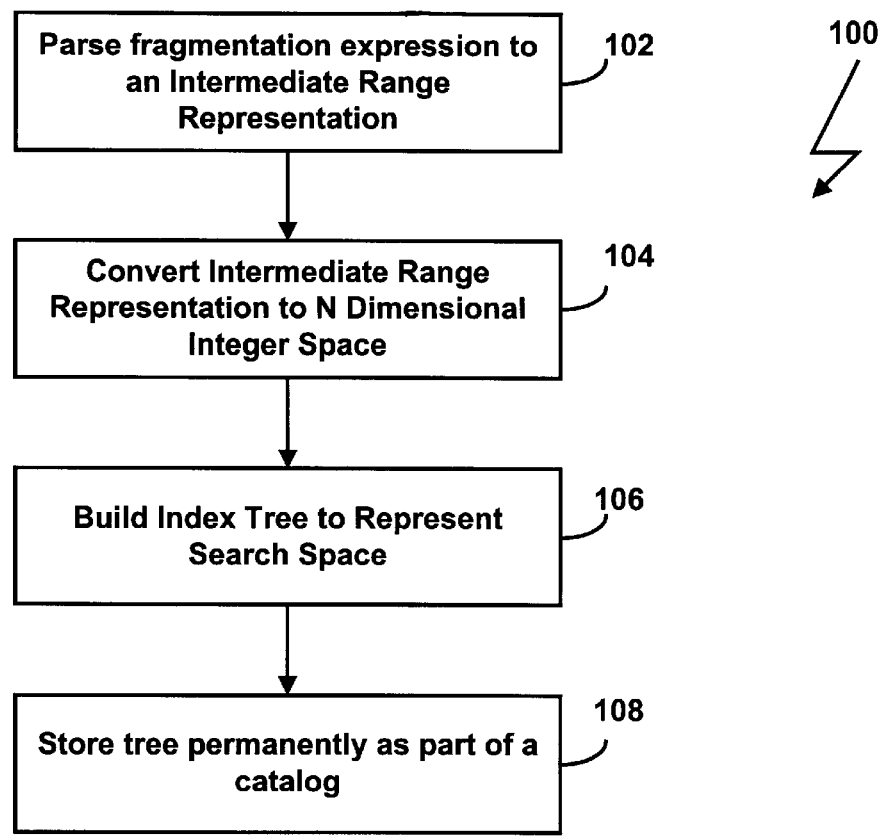
FIG. 2A is a flowchart illustrating a process for creating a tree data structure.
Figure 2B:
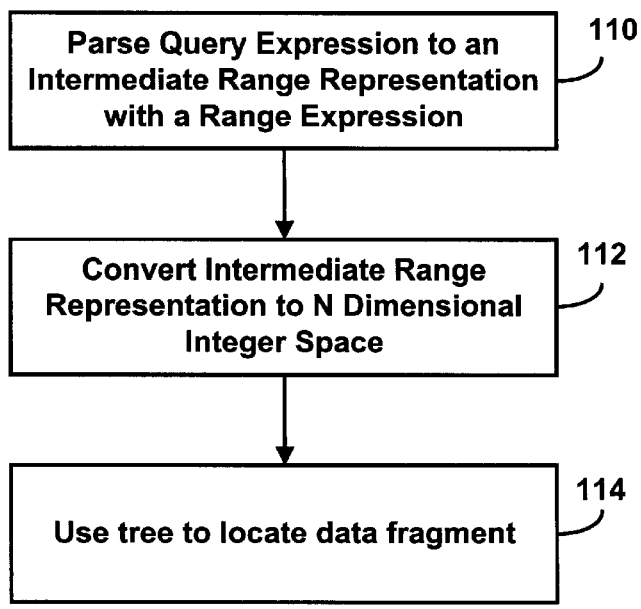
FIG. 2B is a flowchart illustrating a process for applying the tree data structure in response to a query.

FIGS. 2A and 2B are flowcharts of processes for creating and managing data fragments in accordance with the invention. FIG. 2A is a flowchart illustrating a process 100 for applying the tree data structure in response to a query. In FIG. 2, a query fragmentation expression, as generated by the user application 32, is parsed into an intermediate range representation with a range representation (step 102). Next, the intermediate range representation is converted into an N-dimensional integer space, where N is the number of columns in the fragmentation expression or scheme (step 104). An index tree is then generated to represent the search space (step 106). The tree is stored permanently as part of a database catalog (step 108). Once the tree has been constructed, the tree can be used to locate the data fragment, as discussed in more detail below.

Referring now to FIG. 2B, the application of the tree to locate data is shown. First, the query fragmentation expression is parsed into an intermediate range representation with a range representation (step 110). Next, the intermediate range representation is converted into an N-dimensional integer space, where N is the number of columns in the fragmentation expression or scheme (step 112). The tree can then be used to locate data fragments (step 114).

The embodiment of FIG. 2A–2B models data fragmentation as a spatial partitioning problem. That is, each column is considered as a dimension in N-dimensional space. Then, the SKD tree is used as an indexing mechanism. Data fragmentation can be performed for a variety of expressions: >, >=, <, <=, =, and logical operators: IN, NOT, AND, OR, ISNULL. A series of combinations with complicated expression can be handled. The embodiment maps different SQL data types to integer values. In this process, all data points (SQL data values) used in the fragmentation expressions are collected and stored as a multi-dimensional array. Each column's data points are stored in an array. The embodiment of FIG. 2 uses the array index 0 as the index point for a NULL value. This models the ISNULL expression as a minimal point. The system also use the upper bound of the array as the index point for "positive" infinity.

In one embodiment, two kinds of node are used in the tree: index node and data node. Data nodes are leaf nodes of the tree, which contains only data items. A data item in the tree is represented by an array of ranges (low, up) that describe the space. Each pair of (low, up) describes a range in one dimension of the space.

Index nodes are internal (non-leaf) nodes of the tree. Each index node contains the following fields:

| | |
|---|---|
| Index dimension | The dimension of which the index key is in. |
| Index key | The index key value (k) of the index node. |
| Space covered | Each index is responsible for a subspace, this field describes the space covered by all the data items under this index node. |
| Index bitmap | This field is optional and represents fragments that are covered by this node. This makes marking a fragment as active much easier. |
| Left | This field points to the SKD-tree that represents the subspace where all data items' value in the D dimension are smaller than (or equal to) the index key K. |
| Right | This field points to the tree that represents the subspace where all data items' value the D dimension are larger than (or equal to) the index key K |
| Equal flag | This flag indicates which subtree represents the subspace whose values in the D dimension are equal to the index key K. It is either Left or Right. By default, the Equal flag is set to Right. |

The process starts with a data set S. Each data item of S describes a subspace in the m-dimensional space and is of the form: $(1b_{13}1, low_{13}1, up_{31}1, ub_{13}1), \ldots, (1b_{13}m, low_{13}m, up_{13}m, ub_{13}m)$ where each $(1b_{13}i, low_{13}i, up_{13}i, ub_{13}i)$ describes a range in the I-th dimension, $1b_{13}i$ and $ub_{13}i$ indicates whether the range includes the low point and/or the up point (1<I<m). In addition, a multi-dimensional array V is used where V[i] records the number of points and their values of the ith dimension in the data set S.

The data set is then evenly partitioned with a chosen index key value so that a balanced tree can be built. This is achieved by first selecting the dimension that has the most variance—the most points—as the indexing dimension. The median point of that dimension is then used as the index key value to partition the data set.

Figure 3:
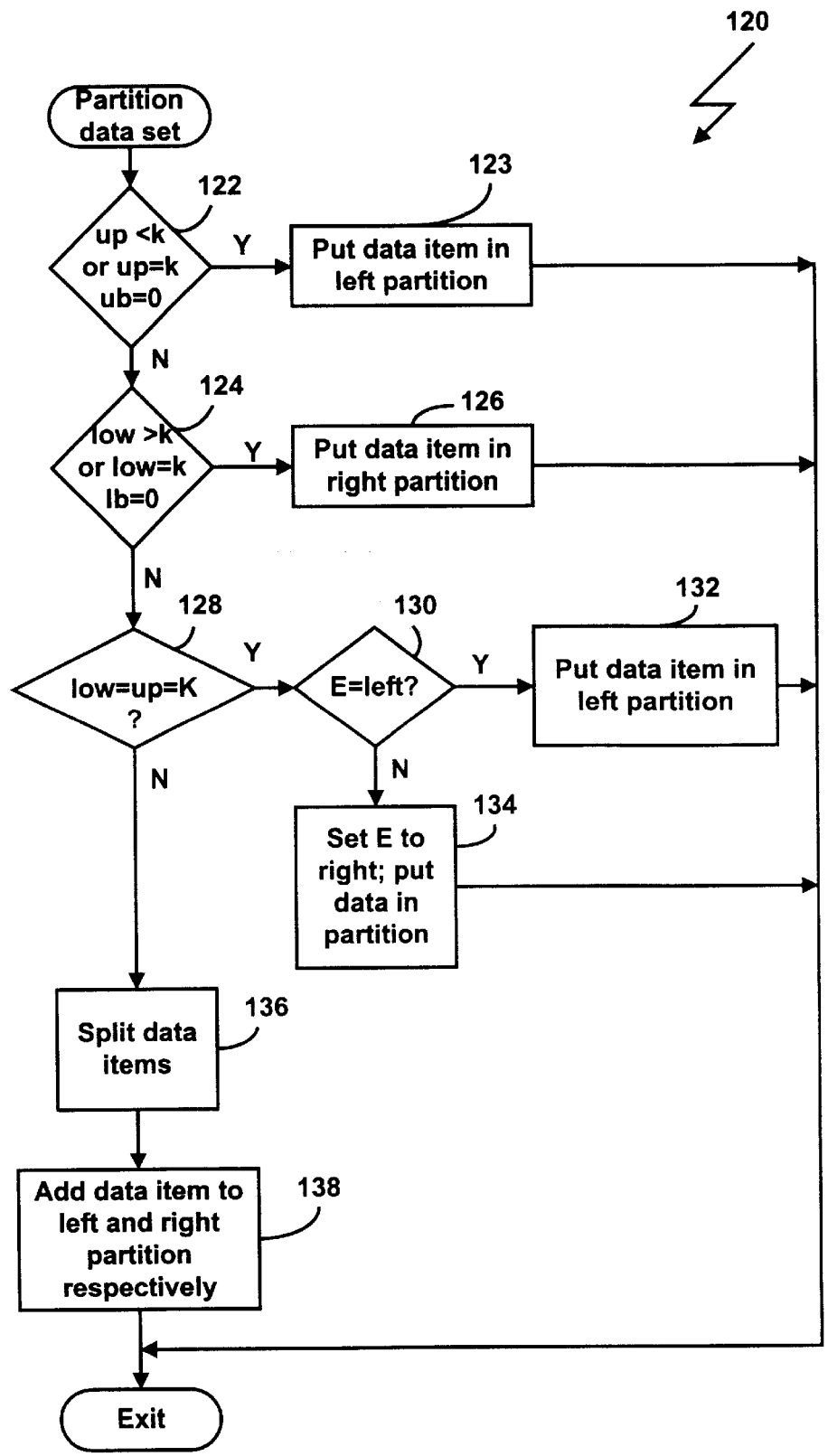
FIG. 3 is a flowchart illustrating a process for partitioning dataset in the data fragmentation process of FIG. 2.

After the index key value has been selected, the data set is partitioned based on that key. Where the index dimension is D, the index key value is K and its associated Equal flag is E, the following operations are performed. For each data items' dimensional value d of the form (low, up, flag) in the data set, a partitioning routine is executed. FIG. 3 shows the partition algorithm. The process of FIG. 3 partitions the data set into two parts, the left part L, and the right part R. The process 120 calls a routine append to add a data item into a data set, and a routine split to split a data item. In splitting a data item, copies of the data item are made, and the data item is partitioned according to the partitioning dimension and key by modifying the corresponding columns' range in the new data items. The new data items need to have the right flags in the partitioning dimension.

Also, the data items in the leaf nodes of the tree should not overlap with each other. This is achieved by adding an overlapping checking when a data item is added into a partition. If the subspace represented by the data item is already completely covered by some data item in the partition already, then that data item is not added to the partition. This effectively eliminates the overlapping subspaces in the leaf nodes of the tree.

Turning now to FIG. 3, a process 120 for partitioning a dataset is shown. This process is needed in managing the fragmentation scheme since each record can only reside in one fragment. Hence, the dataset has to be partitioned. In the process 120, each data item D of the form (low,up,flag) in the dataset, the process 120 is executed. The process 120 partitions the dataset into two parts, a left part L and a right part R.

In FIG. 3, the up attribute of each data item D is compared against an index key value K (step 122). If the up attribute is less than K or if the up attribute is equal to K and the range does not include the up boundary (up_boundary=0), the data item is placed into a left partition (step 123). Alternatively, the process 120 compares a low attribute for each data item D against K (step 124). If the low attribute is greater than K or if the low attribute is equal to K and the range does not include the low boundary (low_boundary=0), the process 120 places the data item in a right partition (step 126). Alternatively, if the low attribute is equal to the up attribute or equal to K (step 128), the process 120 determines whether an equal flag E has been set to indicate the left partition (step 130). If so, the data item is placed in the left partition (step 132). From step 130, if E is not equal to the left partition, the process 120 sets E to the right partition and places the data into the partition using an append call (step 134). From step 123, 126, 132 or 134, the process 120 exits.

From step 128, if the low attribute is not equal to the up attribute, or if the low attribute is not equal to K, the process 120 splits the data item (step 136) and adds the data item to both the left and right partitions, respectively using an append function (step 138) and exits.

Pseudo-code for the flowchart of FIG. 3 is as follows:

If up<K or (up=k and non-inclusive), place the data item to the left partition with an append(L, d).

Else if low>K or (low=k and non-inclusive), then it is put in the right partition with an append(R, d).

Else if low=up=K: if Equal flag E=Left, then partition the data item to the left by call append(L, d); otherwise, set E to Right and append(R, d).

Otherwise, low<=K<=up but low is not equal to up. In this case, split the data item so that part of it goes to the left L and part of it goes to right R, as follows:

(a) split the date item to two parts, ld and rd by calling the split routine, split(d, ld, rd, D, K, E).

(b) add them into the left and the right partition respectively, append(L, ld) and append(R, rd).

Each data node contains only one data item in an implementation of the tree for managing fragmentation. As such, each record can only resides in one fragment. In this embodiment, the data set needs to be further partitioned. When the point count is less than 2, only certain index key values can be used. For example, ranges (x1, x2) and (x1, x2] can not be partitioned using the process 120 (The "]" represents the condition where the upper boundary is included). In this case, additional rules for further partitioning need to be applied. In this case, an appropriate right column needs to be selected. The column on which the ranges of different data items have different flags should be chosen as the indexing column. This is from the observation that two ranges (1<x <5, 1<y<5) and (1<x <5, 1<y<=5) can only be partitioned into two if y is selected as the indexing column. The Equal flag needs to be set so that correct partitioning can be achieved. The heuristics is as follows:

```
/* maximum is two points in each column
 * have to be careful about picking up the split key
 * otherwise recursion won't terminate.
 * suppose two points are x1 < x2, the follow scheme will
 * be followed:
 *         x2 (up)
 *          /\
 *       < /  \ (>=)
 *       x1(1w) [x2, x2]
 *          /\
 *       <= /  \ >
 *       [x1, x1] (x1, x2)
 */
```

Figure 4:
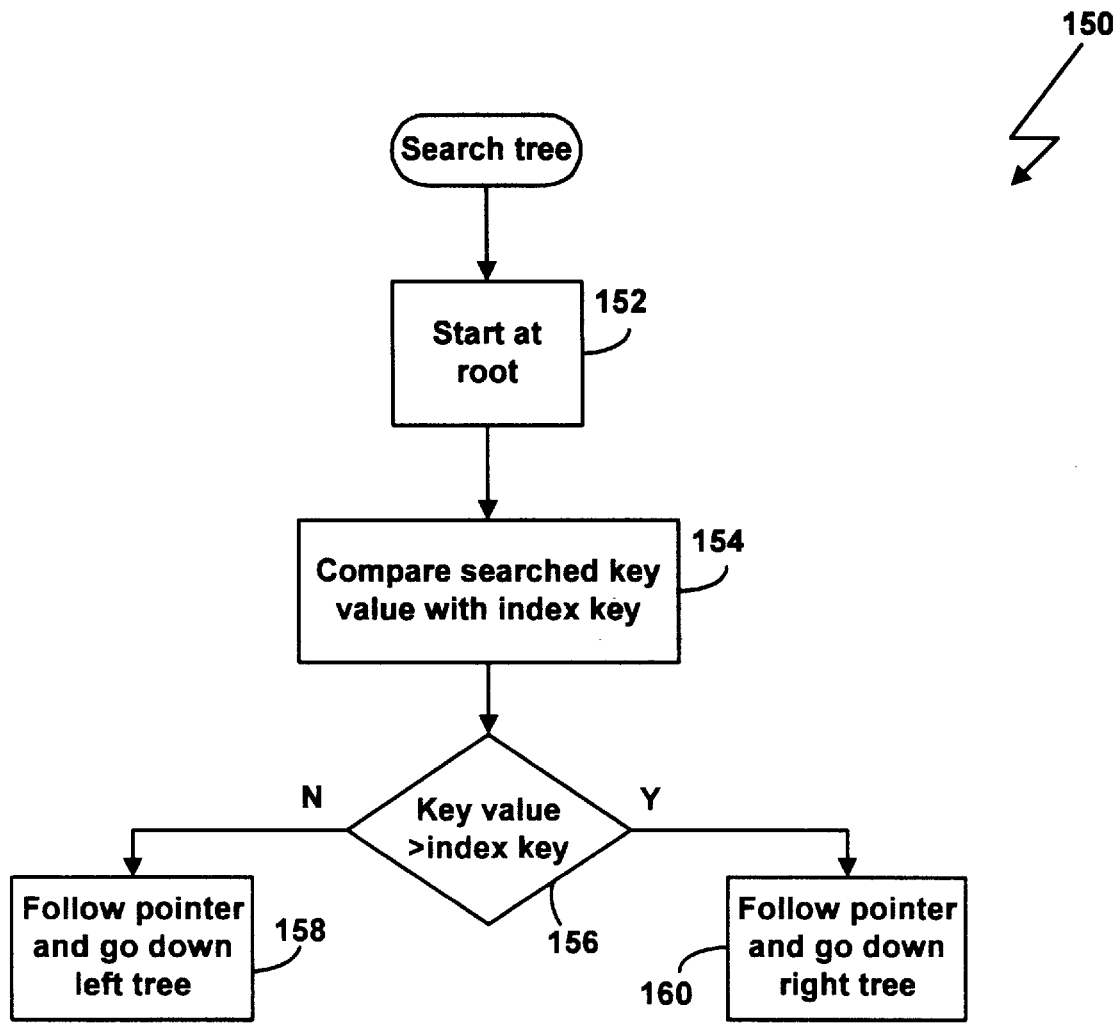
FIG. 4 is a flowchart illustrating a process for searching a tree created in FIG. 2.

Referring now to FIG. 4, a process 150 for searching the tree created in FIG. 2 is detailed. First, the process 150 starts at the root of the tree (step 152). The process 150 then compares a search key value with an index key (step 154). Next, the process 150 compares the key value against the index key (step 156). If the key value is greater than the index key, the process 150 follows a pointer and proceeds down the right tree (step 160). Alternatively, if the key value is less than or equal to the index key, the process 150 follows the pointer and goes down the left tree (step 158).

When searching the tree, the process starts from the root of the tree, compares the searched key value with the index key, and follows the pointer according the result of the comparison. At the data node level, the search point is tested to see if it is covered by the subspace in that node.

When searching a particular range, the process first compares the subspace. searched with the space covered by an index node (starting from the root). If the searched subspace covers the space described by the index node, all fragments covered by the index node are activated using a bitmap field in the index node. Range searches may have to do partitioning, as described in FIG. 3, and thus may follow multiple paths in the tree. If the search space is not completely covered by the nodes in the tree after the process has searched down to the leaf level, if a remainder fragment exists, the remainder fragment is activated.

Figure 5:
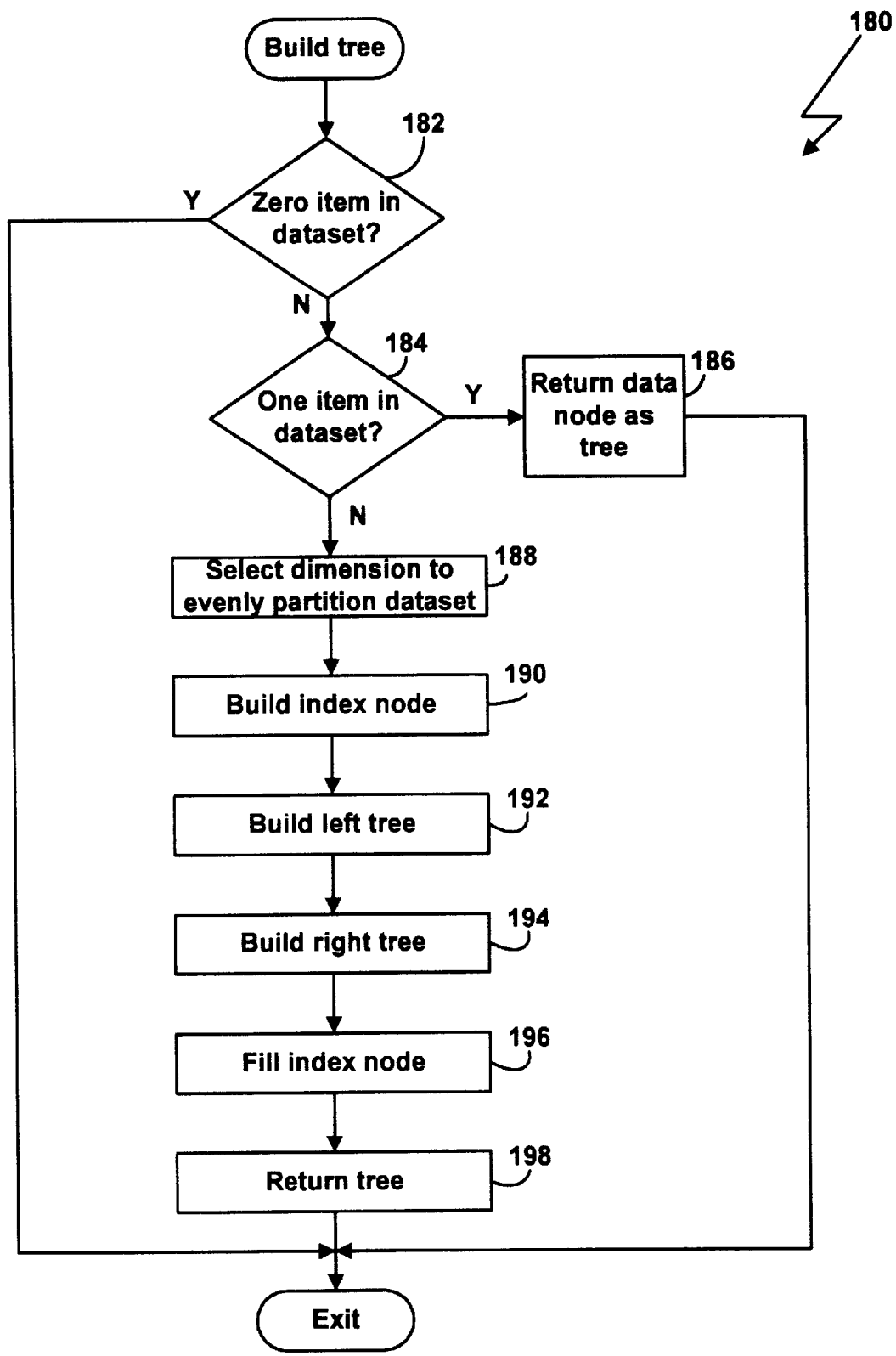
FIG. 5 is a flowchart illustrating a process for building the tree in accordance with FIG. 2.

Referring now to FIG. 5, a process 180 for building the tree used in FIG. 2 is detailed. The basic assumption in the process 180 is that the data set is relatively static with few insertions, deletions and updates on the data set. The most often operation on the data set is look-up (search). The process selects a partition value (the index key value) so that data sets are evenly partitioned.

First, the process 180 determines whether the dataset contains no (zero) item (step 182). If so, the process 180 simply exits. Alternatively, if the dataset contains more than zero item, the process 180 checks whether the dataset contains only one item (step 184). If so, the item is returned at the data node of the tree (step 186) and the process 180 exits. Alternatively, if more than one item exist in the dataset, the process 180 selects a predetermined dimension to evenly partition the dataset, as previously described (step 188). Next, it builds the index node (step 190). The process 180 then builds a left tree (step 192) and also builds a right tree (step 194). The index node is then filled (step 196) by constructing a bitmap in one embodiment. The completed tree is then returned (step 198) before the process of FIG. 4 exits.

Figure 6:
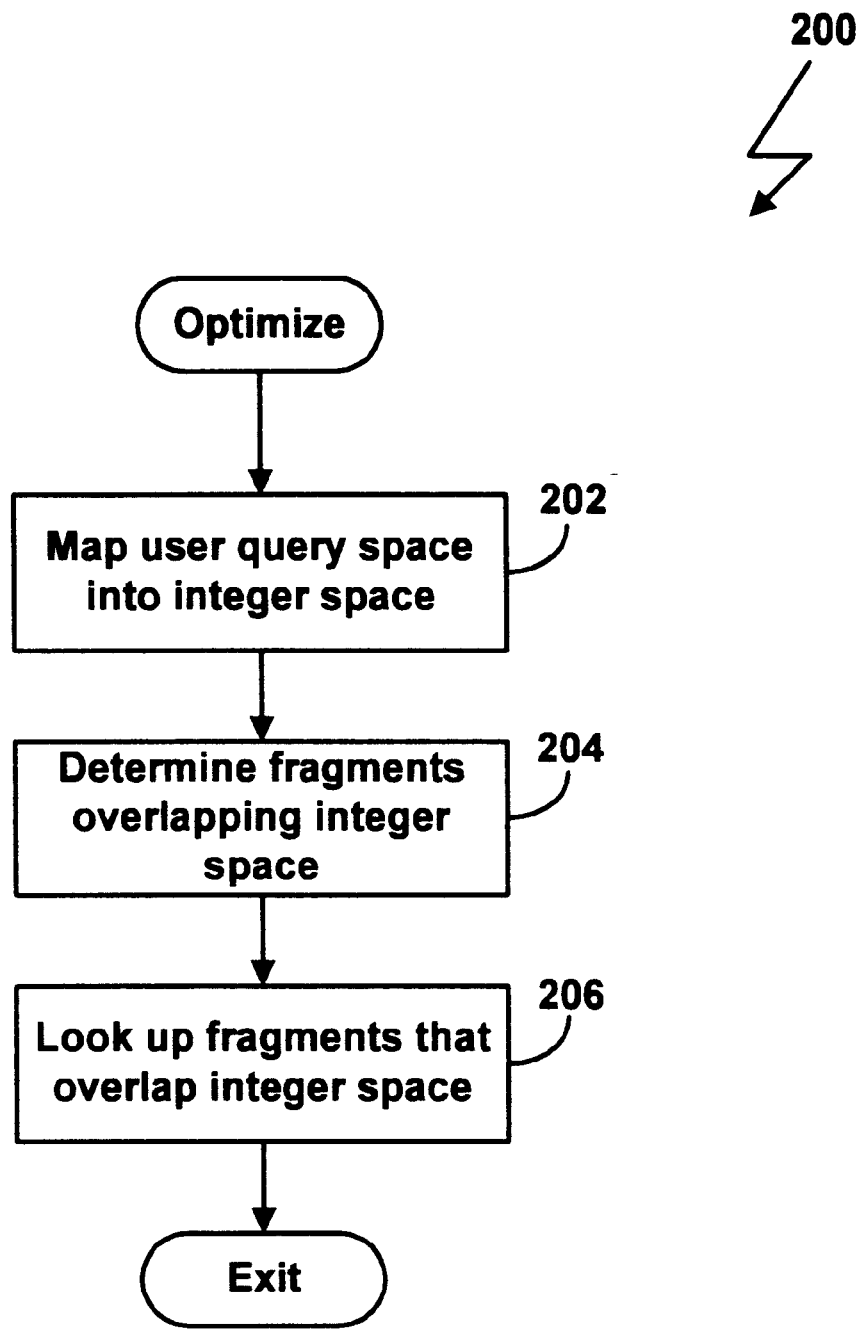
FIG. 6 is a flowchart illustrating a process for optimizing data fragmentation in accordance with the present invention.

Turning now to FIG. 6, an optimization process 200 is shown. First, the process 200 maps a user query space into an integer space (step 202). Next, the process 200 determines fragments associated with the overlapping integer space (step 204). Finally, the process 200 looks up the fragments that overlap the integer space (step 206). The mapping of the user query space into integer space is advantageous since only integer operations need to be performed. In contrast, the conventional user query space may include a variety of data types that can be complex.

Applying the operations of FIGS. 2–6 to a table that is fragmented by range expressions on m columns with N fragments, on average the height of the tree is of O(log N). During a record insertion, the search time to find the correct fragment should be of O(m+log N) because it takes O(log N) to get down to a leaf node and m comparisons to decide if the record belongs to that fragment. Thus, performance is enhanced using the tree. Without the tree, the system is expected to perform an average of N/2 comparisons to find a fragment. It is to be noted that in a special case where only one dimension is partitioned, the tree becomes a binary search tree.

For range query elimination, performance is also improved due to the realization that, if the search space covers the space described by an index node, all fragments described by the index node using the bitmap in the index node are activated. This short-cut saves considerable search cost.

The invention will not be optimal under a worst case scenario where all ranges overlaps each other on all the dimensions, but no one is covered by the other. In this scenario, the construction of the tree will generate more splits, thus adversely affecting the performance. As this is an unlikely situation, the tree should provide good performance overall.

Certain data structures used in one implementation of the invention will be discussed next. First, the structure associated with dimension_t, representing a range in a column, is shown below:

/* range in a column represented by relatively index of the points in that column*/ typedef struct dimension

```
{
    char dm_lb;       /* 1 to include lower bound*/
    char dm_ub;       /* 1 to include upper bound*/
    int  dm_lw;       /* low index of the range*/
    int  dm_up;       /* up index of the range*/
} dimension_t;
```

Next, the data structure for splist, a linked list of subspaces is shown. Each subspace is an array of dimension_t. Each subspace represents a fragment.

/* subspace represented by the range expression indexed by indices in columns */ typedef struct splist

```
{
                     long sp_fragid;
                     dimension_t*sp_range;
                     struct splist *sp_next;
}                    splist_t;
```

Next, skdtree_t is the tree data structure. It has a flag to indicate whether the node is an index node or a data node. skd_internal_t is the index node data structure. skd_data_t is the data structure for data node.

```
typedef struct skdtree
{
    char skd_flag;       /* index node or data node*/
    void *skd_content;   /* either index or data node depends flag*/
} skdtree_t
```

```
#define SKD_INDEX        0x00
#define SKD_DATA         0x01
#define DATANODEP(node)  ((node->skd_flag) & SKD_DATA)
#define datanode(tree)   ((skdt_data_t *) tree->skd_content)
#define indexnode(tree)  ((skdt_internal_t *) tree->skd_content)
/* colarr_t is used for Range Fragment Elimination and stores all the
/* constant points in one column.*/
```

/* colarr_t is used for Range Fragment Elimination and stores all the constant points in
/* one column.*/

```
typedef struct colarr
{
    int    col_id;       /* column id of this column*/
    int    col_dttype;   /* datatype of the column*/
    int    col_npts;     /* number of points (size) in colarr_t*/
    value_t *col_pts;    /* the array of points on this column*/
} colarr_t;
``` fragrange_t is the fragment elimination information data structure. It stores certain metadata information and a pointer to the tree. It is also the accessing point for fragment management information.
/* This structure will be stored on the disk and will contain information
 * required to do Range Fragment Elimination.
 */

```
typedef struct fragrange
{
    int    fr_ncol;           /* number of columns referenced in
                               * the fragment expressions.
                               */
    int        fr_remainder;  * set TRUE if REMAINDER */
    colarr_t   *fr_col;       /* one point array for each column */
    skdtree_t  *fr_skdt;      /* skdtree of ranges (subspace) */
} fragrange_t;
```

In order to save the storage and the time of comparison, all point values (value_t structure) are converted to an integer value. The integer value is an index in the colarr_t->col_pts array.

Moreover, keyarr_t is the data structure used during construction of the tree. It records the base_key of an key array and the number of keys in the array. This is used during partitioning, both the base_key and the cnt variables are modified according to the partitioning.

```
typedef struct keyarr
{
    int base_key;   /* the base key value */
    int cnt;        /* number of keys in the column
                     * starting from base_key, base_key + 1, . . . +cnt
                     */
} keyarr_t;
```

Turning now to FIGS. 7A–7D, exemplary operations on a simplified expression with a logical operator is discussed next. In this example, the simplified expression is:
<simple_exp><logical operation><simple_exp>
where
<simple_exp>=><column><operation><constant>
In this example, a table is created using the following command:
CREATE TABLE T(a char(10), b date)
In this case, the column a is of character type (char) and can store a maximum of ten characters, and column b stores date type of information. The database is fragmented by the following expressions for first, second and third database fragments db1, db2 and db3, respectively:
'cc'<a<'ff' and '7-1-66'<'10-1-86' in db1
'dd'<a<'LL' and '7-1-76'<b<'10-1-96' in db2
and the remainder is in db3
Referring now to FIG. 7A, the above expressions are converted into an intermediate representation. The representation is shown as a list of a two-dimensional array describing the range structure of the expressions. Note that, at this point, the two dimensional data point array is unsorted.

Figure 7A:
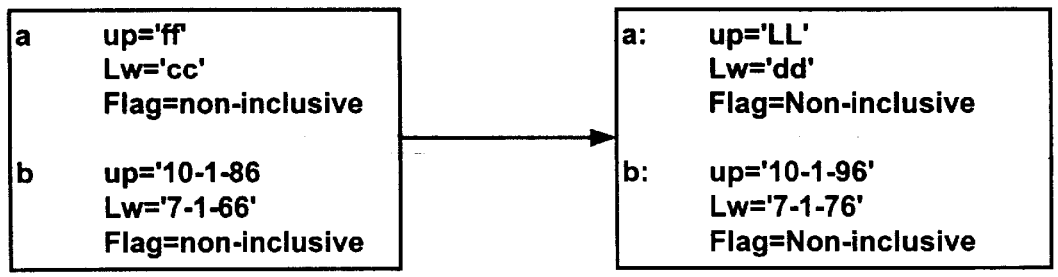
FIGS. 7A–7E are diagrams illustrating exemplary operations of the system of FIG. 1.
Figure 7B:
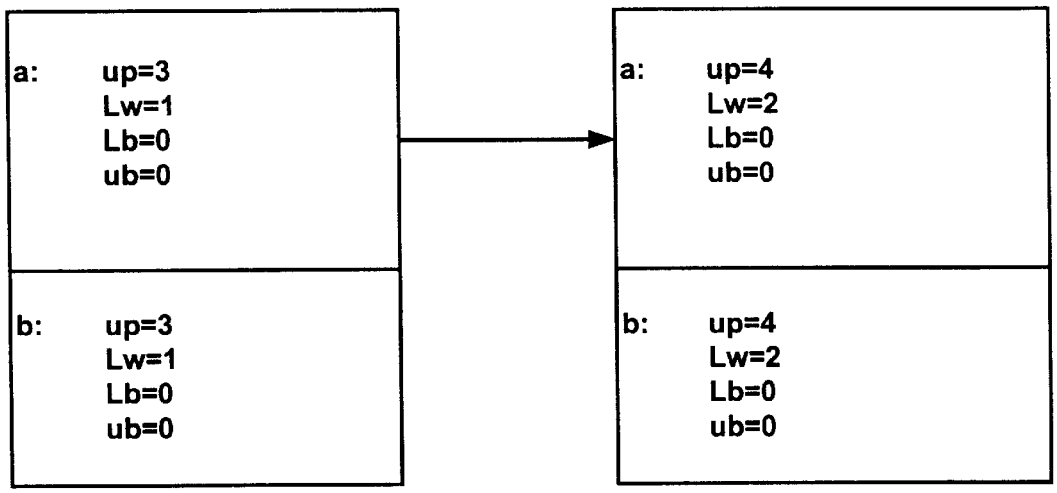

In FIG. 7B, the operation to map the intermediate representation to an integer space representation is performed. At this stage, the fragment data point array is sorted. Further, location 0 of the array is reserved for a NULL value and the data points are stored thereafter. Also, the upper bound value up stores the index value to the data point array. Since 'ff' is the third element in the sorted data point array, up stores a value of 3. The mapping operation is performed for the remaining elements in the dimension_t array.

Figure 7C:
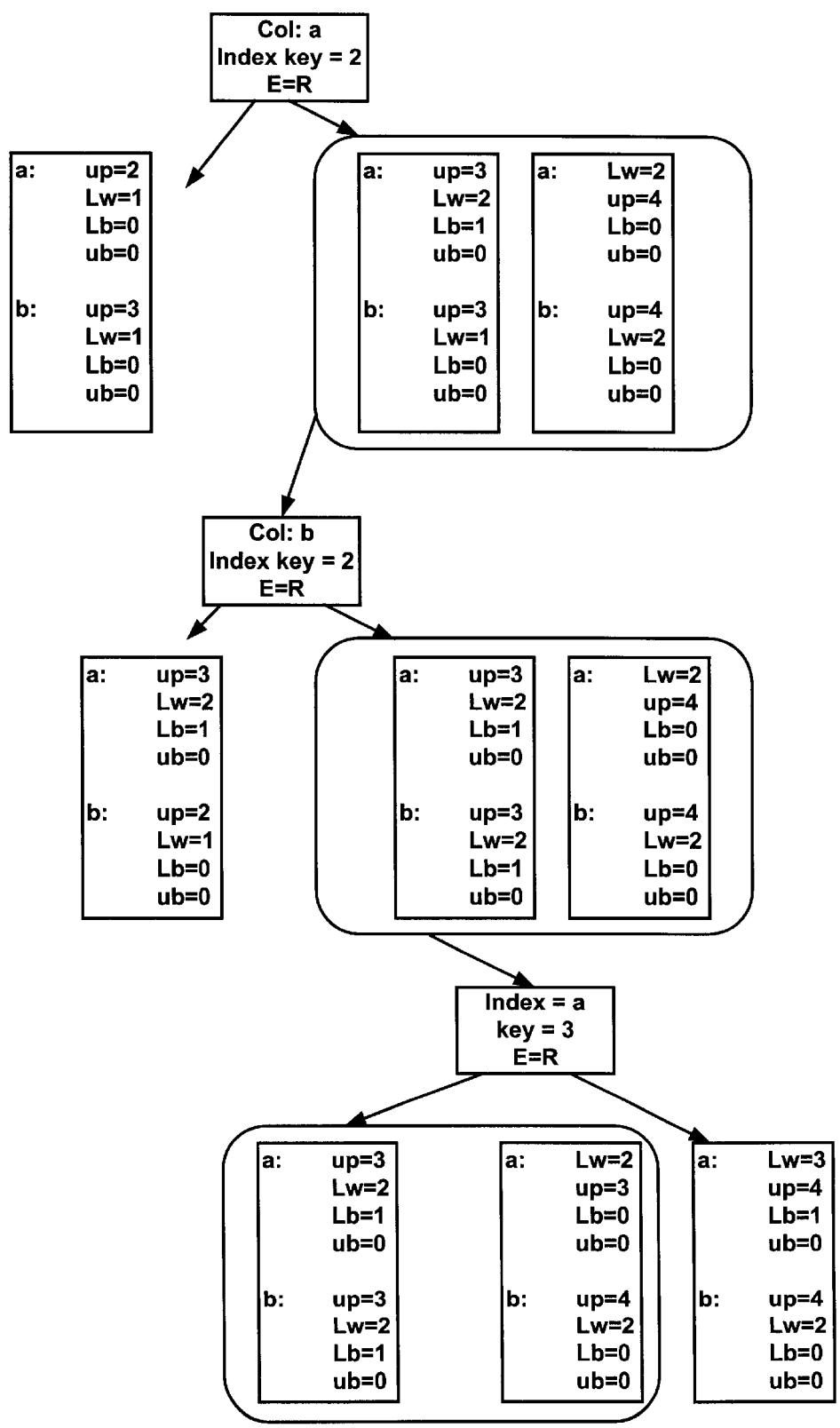
Figure 7D:
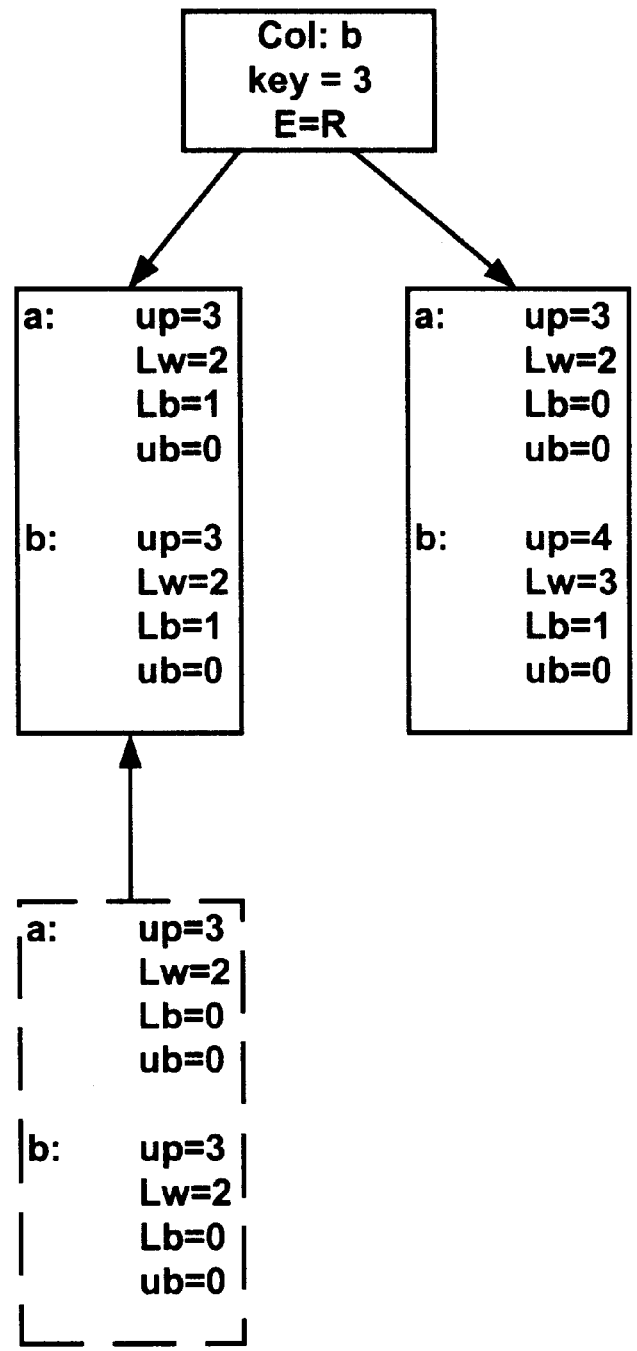

FIGS. 7C and 7D illustrate the step of building the tree in this example. First, the system picks a column that has the maximum number of data points. In this case, a and b have the same number of data points. Hence, the system picks a as a default selection.

In FIG. 7C, the system splits the dimension_t array with the index being set to column a, the key being 2 and Equal set to Right. The split creates one left partition and two right partitions. Since the left partition (lower bound=1 and upper bound=2) has only one data node, the system is done with the left partition.

With respect to the right partitions, the system picks column b since it now has most data points. After splitting with the index being set to column b the key being 2, and Equal set to Right., the tree has one left partition and two right partitions. Again, the left partition is left alone since it has one node. The right partitions are split again with the index being set to column a, the key being 3, and Equal set to Right.

FIG. 7D shows the result of the split of the right columns in step 3. In this case, the split results in another left partition and a right partition. Note that the partition at the bottom of FIG. 7D contains an overlapped partition. The bottom partition is then discarded. In this manner, overlapping fragments are pruned from the tree, thus improving search performance. Moreover, the height of the tree generated by the invention is minimized.

During operation, a user may execute a query such as:

Select from T when '*dd*'<*a* '*ff*' & 7-1-76<*b*<'7-1-86'

Figure 7E:
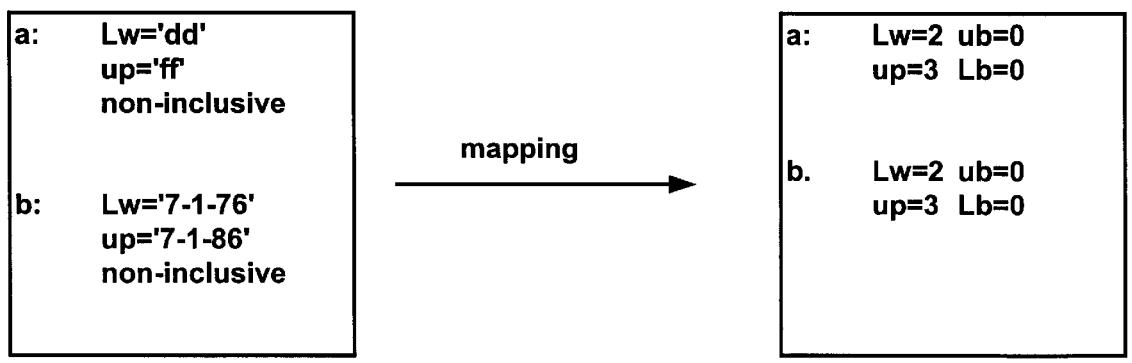

This query is resolved into an intermediate form of FIG. 7E. In this example, the mapping process maps the intermediate representation to the integer value of 3 to represent the value of '7-1-86'. The SKD tree can then be rapidly searched using integer comparison operations on the index of the array rather than SQL comparison operations. This is both simple and efficient as compared to SQL type comparisons.

The tree thus provides high performance for managing data fragments in a database. Although the fragmentation schema represents only two columns in this example, the tree can manage large databases where the number of columns used for fragmentation can become quite large. The modeling and mapping from SQL data-type to integer contribute to the simplicity and efficiency of the system in performing operations with data fragmentation.

Figure 8:
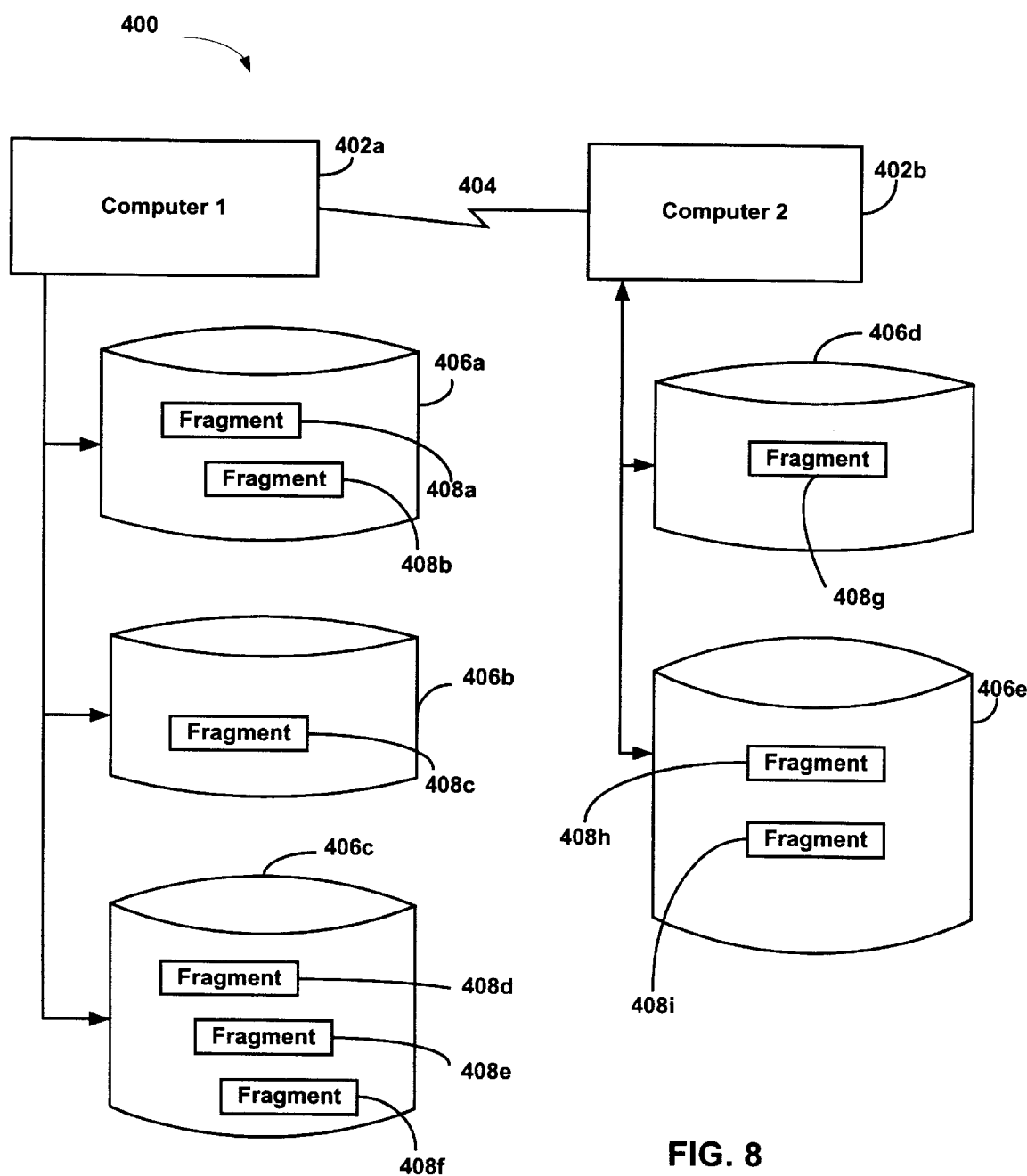
FIG. 8 is a block diagram of a computer system platform suitable for implementing an embodiment of a database system in accordance with the present invention.

FIG. 8 illustrates a computer system 400 that is a suitable platform for supporting a relational database system and storing relational database tables, which will be referred to simply as tables. The computer system 400 includes one or more computers 402 (individually, computers 402*a* and 402*b*). Multiple computers may be connected by a link 404, which may be high-speed backbone that creates the cluster of computers, or a local or wide-area network connection linking the computers. The computers have one or more persistent data stores 406*a*–406*e*. Typically, each data store is a storage subsystem including one or more disk drives that operate independently of the disk drives of every other data store, which are controlled through disk controllers installed in the associated computer and operated under the ultimate control of the database system.

In the database system that will be described and used for illustrative purposes, a database definition initially resides in one database storage space in which the database is placed by operation of a "create database" command to the database system. A database initially includes a set of relational tables called the system catalogs (not shown). The system catalogs describe all aspects of the database, including the definitions of all tables and the fragmentation of all tables. As new tables are created, with "create table" commands, for example, new data is added to the system catalogs to describe the new tables.

The system catalogs include a system fragments table for persistently storing information about the fragmentation of the database. Each fragment may be represented by an individual row in the system fragments table. When the system needs to refer to fragments, it can run queries against the system fragments table to obtain the necessary fragmentation information for any given table. One attribute of the system fragments table is the fragmentation method: a table that is fragmented using a referential fragmentation scheme, described later in this specification, will have an attribute value such as "reference" that identifies the fragment as one that was created with a referential fragmentation scheme. The referential key information that is used by a referential fragmentation scheme is also stored in a table in the system catalogs.

Each data store may store one or more fragments 408*a*–408*i* of one or more tables managed by the database system. It is generally advantageous not to split fragments across data storage subsystems that can be operated in parallel.

Figure 9:
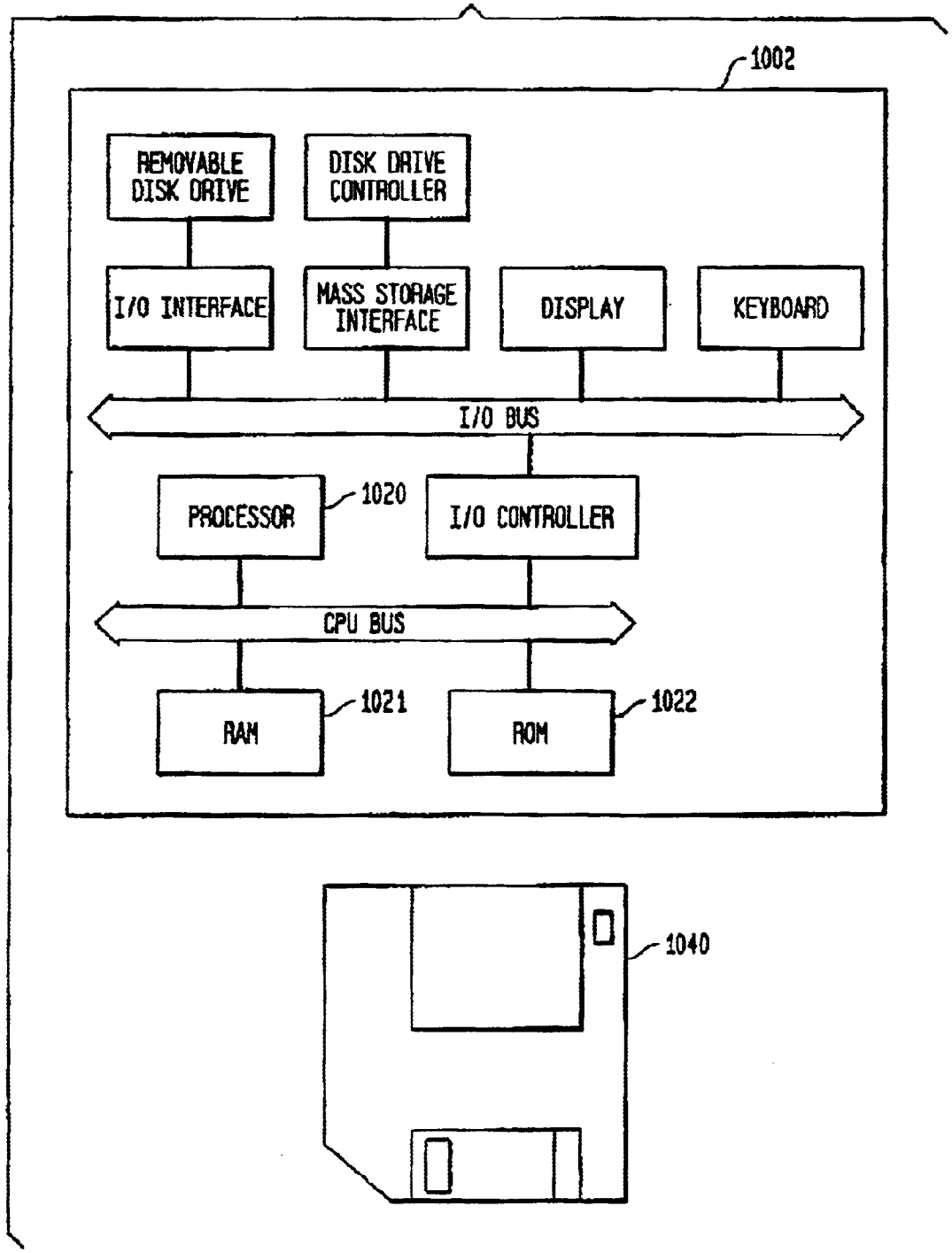
FIG. 9 is a block diagram of a computer and computer elements suitable for use in the database engine of FIG. 1.

Shown in FIG. 9 is a block diagram of a computer 1002 suitable for use in the computer system platform described earlier with reference to FIG. 1. The invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors 1020 include, by way of example, both general and special purpose microprocessors. Generally, a processor will receive instructions and data from a read-only memory 1022 and/or a random access memory 1021. Storage devices suitable for tangibly embodying computer program instructions include all forms of non-volatile memory, including by way of example semiconductor memory devices, such as EPROM, EEPROM, and flash memory devices; magnetic tapes; magnetic disks such as internal hard disks and removable disks 1040; magneto-optical disks; and CD-ROM disks. Any of the foregoing may be supplemented by, or incorporated in, specially-designed ASICs (application-specific integrated circuits).

Other embodiments are within the scope of one or more of the following claims.

What is claimed is:

1. In a relational database system, a computer-implemented method for managing data fragments in a database, the method comprising:

converting a query expression to a multidimensional intermediate range representation;

mapping the intermediate range representation to an integer range representation;

building an index tree data structure, based on the mapping, to represent a search space associated with the data fragments; and using the index tree data structure to locate a desired data fragment.

2. The method of claim 1, where the integer range representation is independent of Structured Query Language (SQL) data types.

3. The method of claim 1, further comprising using the tree data structure to update the data fragment.

4. The method of claim 1, further comprising using the tree data structure to insert data into a data fragment.

5. The method of claim 1, further comprising using the tree data structure to select data in a data set.

6. The method of claim 1, further comprising using the tree data structure during internal database operation.

7. The method of claim 1, further comprising selecting the data using an SQL select statement.

8. The method of claim 1, wherein the data tree structure is used to locate the data fragment.

9. The method of claim 1, further comprising partitioning a data set into even segments to balance the tree data structure.

10. The method of claim 9, further comprising populating the tree data structure.

11. The method of claim 1, further comprising mapping all data types into an integer pace.

12. The method of claim 1, further comprising:

collecting data points used in one or more fragmentation expressions; and storing the data points in a multi-dimensional array.

13. The method of claim 1, further comprising using the first index into the array as an index point for a NULL value.

14. The method of claim 1, further comprising using an upper bound of the array as an index point of positive infinity.

15. The method of claim 1, wherein the intermediate range representation is sorted.

16. The method of claim 15, wherein the mapping step further comprises using a binary search to convert the intermediate range representation into the integer range representation.

17. The method of claim 1, wherein the index tree data structure represents a multi-dimensional search space.

18. The method of claim 1, wherein the using step further comprises searching the index tree data structure with an $O(\log(N))$ search complexity.

19. The method of claim 1, wherein two or more of the data fragments overlap.

20. The method of claim 1, wherein the index tree data structure is a binary tree.

21. A relational database system apparatus, comprising:

means for converting a query expression to a multidimensional intermediate range representation;

means for mapping the intermediate range representation to an integer range representation;

means for building an index tree data structure, based on the mapping, to represent a search space associated with the data fragments; and means for using the index tree data structure to locate a desired data fragment.

22. The apparatus of claim 21, where the integer range representation is independent of Structured Query Language (SQL) data types.

23. The apparatus of claim 21, further comprising means for using the tree data structure to update the data fragment.

24. The apparatus of claim 21, further comprising means for using the tree data structure to insert data into a data fragment.

25. The apparatus of claim 21, further comprising means for using the tree data structure to select data in a data set.

26. The apparatus of claim 21, further comprising means for using the tree data structure during internal database operation.

27. The apparatus of claim 21, further comprising means for selecting the data using an SQL select statement.

28. The apparatus of claim 21, wherein the data tree structure is used to locate the data fragment.

29. The apparatus of claim 21, further comprising means for partitioning a data set into even segments to balance the tree data structure.

30. The apparatus of claim 29, further comprising means for populating the tree data structure.

31. The apparatus of claim 21, further comprising means for mapping all data types into an integer space.

32. The apparatus of claim 21, further comprising:

means for collecting data points used in one or more fragmentation expressions; and means for storing the data points in a multi-dimensional array.

33. The apparatus of claim 21, further comprising means for using the first index into the array as an index point for a NULL value.

34. The apparatus of claim 21, further comprising means for using an upper bound of the array as an index point to positive infinity.

35. The apparatus of claim 21, wherein the intermediate range representation is sorted.

36. The apparatus of claim 35, wherein the mapping means further comprises means for using a binary search to convert the intermediate range representation into the integer range representation.

37. The apparatus of claim 21, wherein the index tree data structure represents a multi-dimensional search space.

38. The apparatus of claim 21, wherein the using means further comprises an O(log(N)) search complexity means for searching the index tree data structure.

39. The apparatus of claim 21, wherein one or more oft he data fragments overlap.

40. The apparatus of claim 21, wherein the index tree data structure is a binary tree.

* * * * *